(12) United States Patent
Todoroki

(10) Patent No.: US 10,346,251 B2
(45) Date of Patent: Jul. 9, 2019

(54) INFORMATION PROCESSING APPARATUS, NON-TRANSITORY COMPUTER READABLE MEDIUM, AND INFORMATION PROCESSING METHOD

(71) Applicant: FUJI XEROX CO., LTD., Tokyo (JP)

(72) Inventor: Hiroshi Todoroki, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 219 days.

(21) Appl. No.: 15/219,615

(22) Filed: Jul. 26, 2016

(65) Prior Publication Data

US 2017/0228297 A1 Aug. 10, 2017

(30) Foreign Application Priority Data

Feb. 5, 2016 (JP) ................................. 2016-020351

(51) Int. Cl.
*G06F 11/00* (2006.01)
*G06F 11/14* (2006.01)

(52) U.S. Cl.
CPC .............................. *G06F 11/1438* (2013.01)

(58) Field of Classification Search
CPC ................................................ G06F 11/1438
USPC .............................. 714/15, 16, 17, 18, 20, 2
See application file for complete search history.

(56) References Cited

U.S. PATENT DOCUMENTS

| | | | |
|---|---|---|---|
| 5,918,226 A * | 6/1999 | Tarumi | G06Q 10/10 |
| 2003/0101085 A1* | 5/2003 | Butler, III | G06Q 10/06 705/7.15 |
| 2010/0013625 A1* | 1/2010 | Kouzan | H04M 11/04 340/508 |
| 2011/0124406 A1* | 5/2011 | Blackburn | G07F 17/323 463/25 |
| 2014/0195258 A1* | 7/2014 | Burton | G06Q 10/0633 705/2 |

FOREIGN PATENT DOCUMENTS

| | | |
|---|---|---|
| JP | H10-326208 A | 12/1998 |
| JP | 2002-297796 A | 10/2002 |
| JP | 2010-064399 A | 3/2010 |
| JP | 2015-118440 A | 6/2015 |

\* cited by examiner

*Primary Examiner* — Dieu Minh T Le
(74) *Attorney, Agent, or Firm* — Oliff PLC

(57) ABSTRACT

An information processing apparatus includes: a reception unit that receives a countermeasure applied to a job in a case where a failure occurs in the job executed according to a flow; an extraction unit that extracts another job in which a previous-stage process, which is a process that is performed before a process in which a failure occurs in the flow, is similar from a storage unit storing plural jobs in which failures occur; and a presentation unit that presents the job extracted by the extraction unit and a direction indicating whether or not the countermeasure is applied to the job such that the direction can be received.

6 Claims, 10 Drawing Sheets

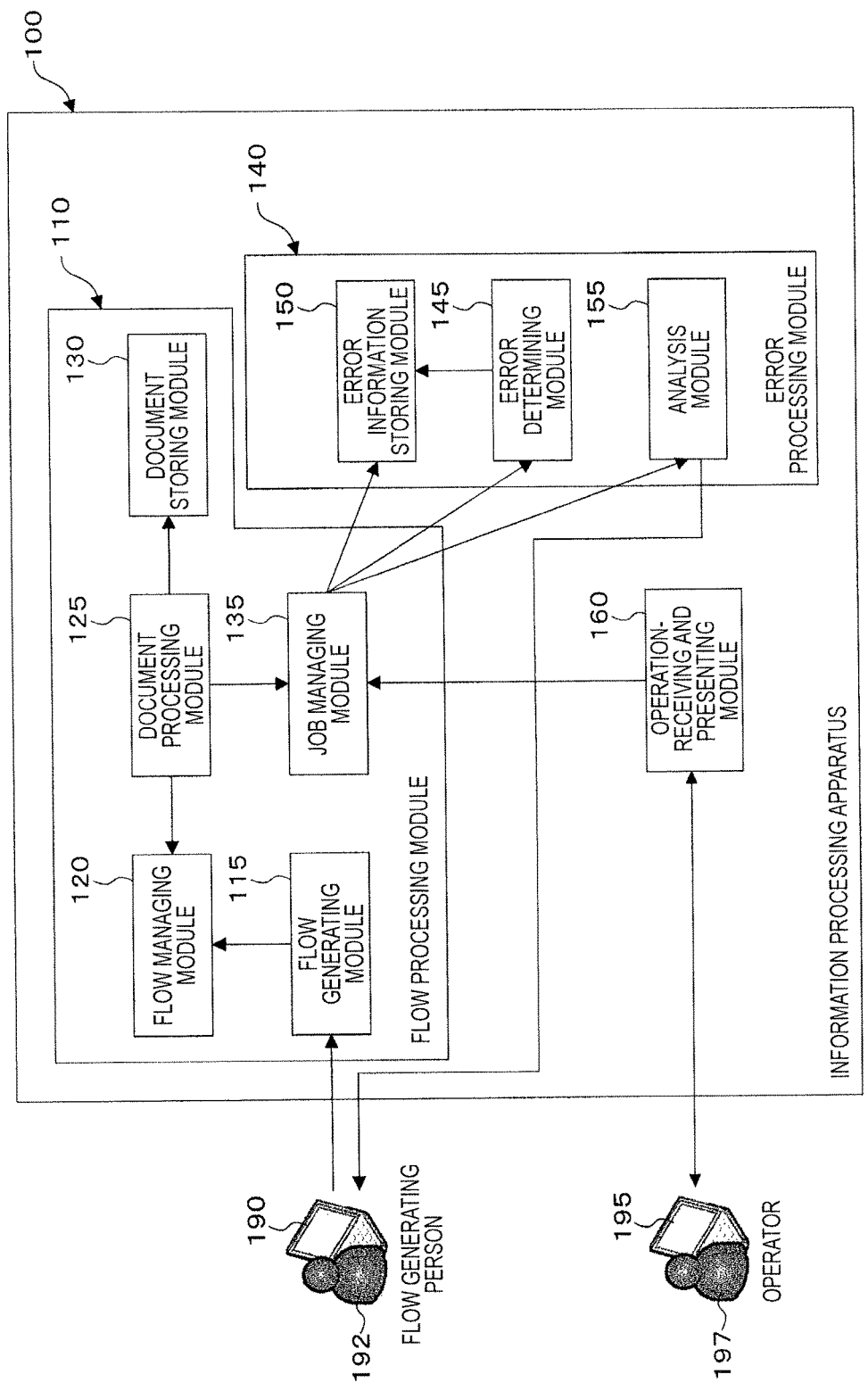

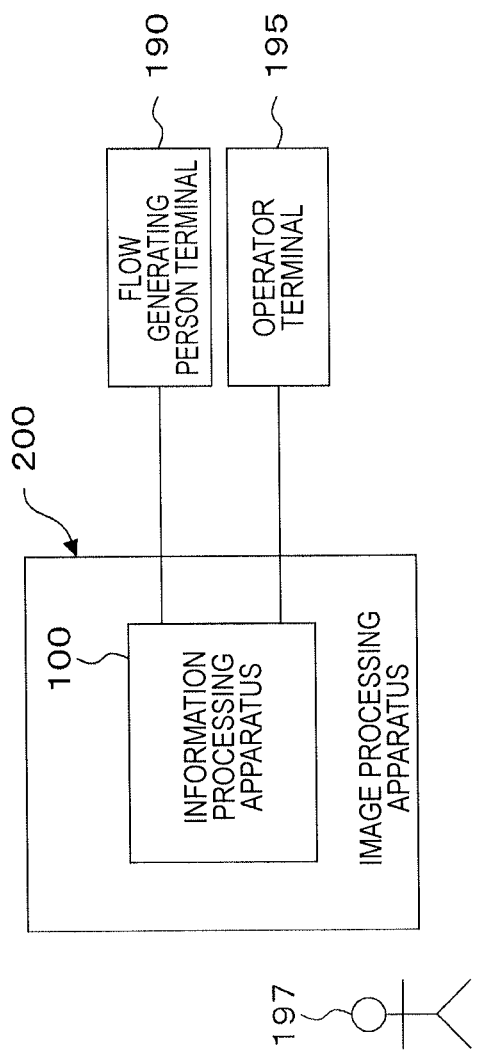

FIG. 8

ERRORS HAVE OCCURRED IN FOLLOWING FLOW AND PROCESS IS RESTARTED. PLEASE CHECK FLOW.

ERROR HAS OCCURRED IN "BARCODE RECOGNIZING". PLEASE REVIEW SETTING OF "DOCUMENT CONVERTING".

| FLOW DEFINITION NAME | EXECUTION NUMBER | ERROR NUMBER | RESTART NUMBER | ERROR OCCURRENCE PLACE | ERROR OCCURRENCE TIME PREVIOUS-STAGE PROCESS |
|---|---|---|---|---|---|
| FLOW A | 100 | 10 | 8 | BARCODE RECOGNIZING | DOCUMENT CONVERTING |
| FLOW B | 120 | 0 | 0 | — | — |
| FLOW C | 60 | 10 | 5 | BARCODE RECOGNIZING | AUTOMATIC ERECTING AND DOCUMENT CONVERTING |
| FLOW D | 80 | 0 | 0 | — | — |

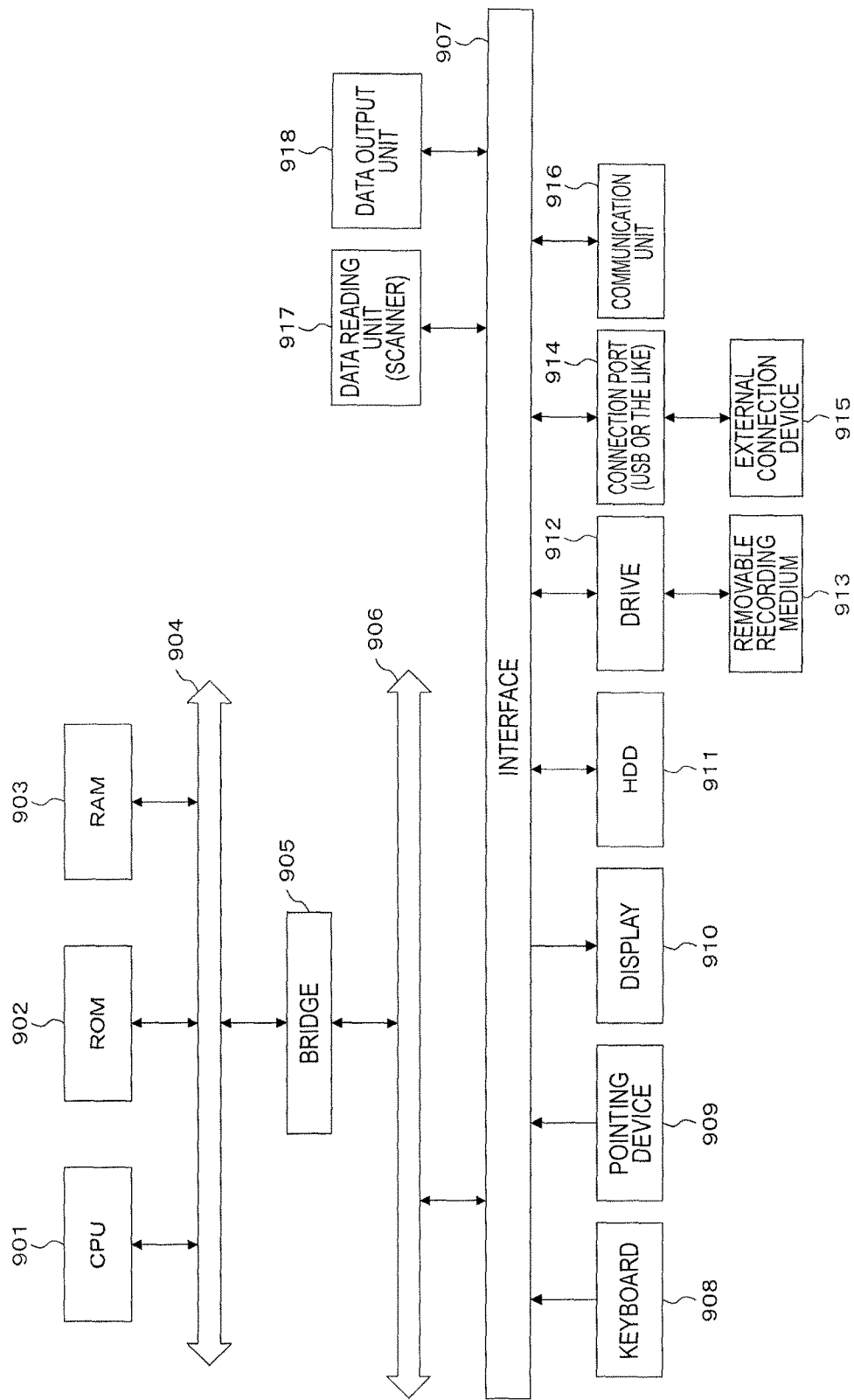

INFORMATION PROCESSING APPARATUS, NON-TRANSITORY COMPUTER READABLE MEDIUM, AND INFORMATION PROCESSING METHOD

CROSS-REFERENCE TO RELATED APPLICATION

This application is based on and claims priority under 35 USC 119 from Japanese Patent Application No. 2016-020351 filed on Feb. 5, 2016.

BACKGROUND (i) Technical Field

The present invention relates to an information processing apparatus, a non-transitory computer-readable medium and a information processing method.

SUMMARY

An information processing apparatus according to one aspect of the present invention includes: a reception unit that receives a countermeasure applied to a job in a case where a failure occurs in the job executed according to a flow; an extraction unit that extracts another job in which a previous-stage process, which is a process that is performed before a process in which a failure occurs in the flow, is similar from a storage unit storing plural jobs in which failures occur; and a presentation unit that presents the job extracted by the extraction unit and a direction indicating whether or not the countermeasure is applied to the job such that the direction can be received.

BRIEF DESCRIPTION

Exemplary embodiments of the present invention will be described in detail based on the following figures, wherein:

FIG. 1 is a diagram that illustrates a conceptual module configuration of a configuration example according to this exemplary embodiment;

FIGS. 2A and 2B are explanatory diagrams that illustrate examples of the configuration of a system using this exemplary embodiment;

FIG. 8 is an explanatory diagram that illustrates an example of the presentation of an error job list; and FIG. 9 is a block diagram that illustrates an example of the hardware configuration of a computer realizing this exemplary embodiment.

DETAILED DESCRIPTION

Figure 2B:
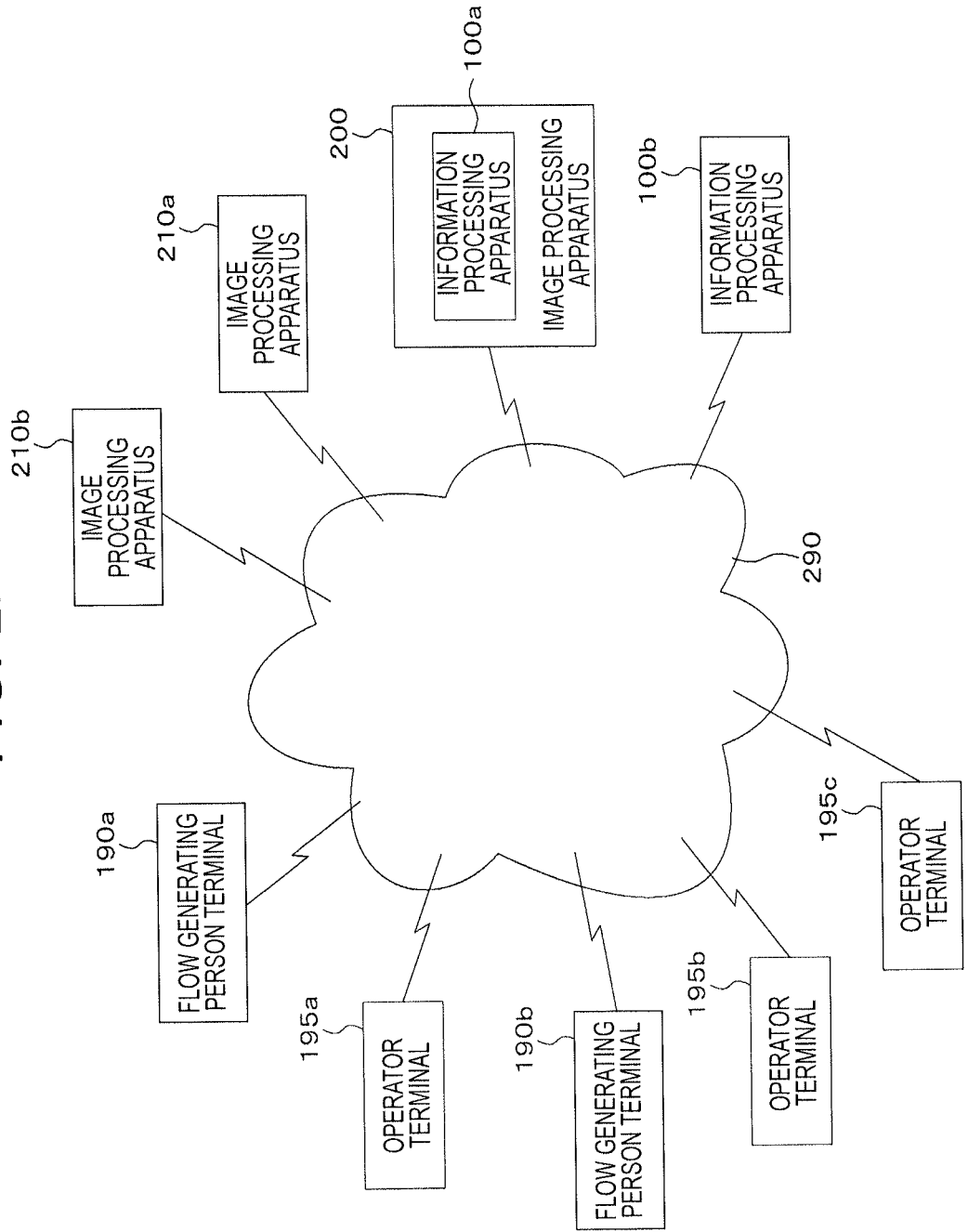

Hereinafter, examples of an exemplary embodiment for realizing the present invention will be described with reference to the drawings.

FIG. 1 is a diagram that illustrates a conceptual module configuration of a configuration example according to this exemplary embodiment.

Here, a module represents a component of software (computer program) that, generally, can be logically separated, hardware, or the like. Thus, a module according to this exemplary embodiment represents not only a module of a computer program but also a module of a hardware configuration. Accordingly, this exemplary embodiment also describes a computer program (a program causing a computer to execute each sequence, a program causing a computer to function as each unit, or a program for realizing each function in a computer), a system, and a method for functioning as such a module. Here, for the convenience of description, while "storing", "causing storage", or words equivalent thereto are used, such words, in a case where an exemplary embodiment is a computer program, mean "storing in a storage device" or "controlling a storage device for storage". In addition, while a module may have a one-to-one correspondence with a function, in the implementation, one module may be configured with one program, plural modules may be configured with one program, or, as an opposite case, one module may be configured with plural programs. Furthermore, plural modules may be executed by one computer, or one module may be executed by plural computers using computers in a distributed or parallel environment. In addition, in one module, another module may be included. Hereinafter, a term "connection" is used also in the case of a logical connection (data exchange, a direction, a reference relation among data, or the like) in addition to the case of a physical connection. A term "predetermined" represents that a status is determined before a target process and includes a meaning of being determined not only before the start of a process according to this exemplary embodiment but also before a target process even after the start of a process according to this exemplary embodiment in accordance with a status or state at that time or a status or state until now. In a case where there are plural "predetermined value", the values may be different from each other, or two or more values (apparently, including all the values) may be the same. In addition, a description having a meaning of "B is performed in the case of A" is used as a meaning representing that "it is determined whether A or not, and B is performed in a case where A is determined". However, a case where it is not necessary to determine whether A or not is excluded.

In addition, a system or an apparatus includes a case of being realized by one computer, hardware, apparatus, or the like in addition to a case of being configured with connecting plural computers, hardware, apparatuses, or the like (including communication connection having one-to-one connection) through a communication unit such as a network (including a communication connection of one-to-one correspondence). An "apparatus" and a "system" are used as terms having the same meaning. Apparently, a "system" does not include a social "structure" (social system) that is an artificial determination.

For each process according to each module or, in a case where plural processes are performed within a module, for each of the processes, target information is read from a storage device, the process is performed, and then, a result of the process is written into the storage device. Thus, the description of reading data from a storage device before the process and writing data into the storage device after the process may not be presented. In the storage device described here, a hard disk, a random access memory (RAM), an external storage medium, a storage device configured through a communication line, a register included inside a central processing unit (CPU), and the like may be included.

An information processing apparatus 100 according to this exemplary embodiment is an application of a countermeasure to a failure occurring in a job executed according to a flow and, as illustrated in the example of FIG. 1, includes a flow processing module 110, an error processing module 140, and an operation-receiving and presenting module 160.

A flow defines the flow of a series of processes (a type, a model, or a class), and a job is an entity (instance) generated by the flow. For example, a series of processes for a document image are defined as a flow, and a job according to the flow is generated for a read document image by an image processing apparatus (for example, an image processing apparatus 200 to be described later or the like) having a scanning function. Particularly, this flow may be referred to as a document flow.

In such a job, a failure (hereinafter, referred to also as an error) may occur. In a case where a failure occurs, and the failure is notified to an executer of the job, a countermeasure may be not immediately directed. Particularly, since there are cases where it takes time to execute a job, it is difficult to direct a countermeasure. In addition, there are cases where plural jobs according to one flow are executed. Accordingly, there are cases where plural jobs in which a failure occurs are stored. Furthermore, in a case where a failure occurs in a job, the execution of the job is stopped, and it becomes a state waiting for a direction for a countermeasure.

A countermeasure for a failure is based on a premise that a manual operation is performed by an operator. The reason is that there are many cases where it is difficult to mechanically perform a countermeasure due to different causes of each failure. Thus, in a technology disclosed, it is necessary to perform operations of designating countermeasures for failures in jobs corresponding to the number of the failures (more precisely, the number of the jobs in which the failures occur).

However, there are many cases where the countermeasures are the same in the case of jobs similar to each other.

In a case where a countermeasure A for a failure in one job A is determined, the information processing apparatus 100 extracts another job B, in which a failure occurs, similar to the job A and enables setting a countermeasure B for the failure in the another job B to be the same as the countermeasure A for the failure in the job A. Accordingly, in a case where the countermeasure B is set to be the same as the countermeasure A, the number of operations of designating countermeasures is decreased.

The flow generating person 192 is an administrative user defining (generating) a flow of a typical document process. A flow generating person terminal 190 is operated by the flow generating person 192 and communicates with the information processing apparatus 100.

An operator 197 is a person who directs the execution of a job. In a case where a failure occurs in an executed job, the operator 197 is a user having a role of checking the job (hereinafter, referred to also as an error job) or the failure and directing a countermeasure as necessary. An operator terminal 195 is operated by the operator 197 and communicates with the information processing apparatus 100.

More specifically, there are at least the following countermeasures for failures.

(1) The job is executed again from the start.

For example, in the case of a connection failure in a communication line, re-execution of the job is selected.

(2) A process in which the failure occurs is skipped, and the execution of the job is restarted from the middle.

(3) The job is deleted (stopped).

In the case of this countermeasure, internal intermediate data of the flow processing module 110 is deleted as well.

The flow processing module 110 includes a flow generating module 115, a flow managing module 120, a document processing module 125, a document storing module 130, and a job managing module 135. The flow processing module 110 is a flow system that performs automatic processing/distribution process in accordance with a flow definition.

The flow generating module 115 is connected to the flow managing module 120. The flow generating module 115 generates a flow in accordance with an operation of the flow generating person 192. For example, in the flow, designation of a recognition range of a document may be included.

The flow managing module 120 is connected to the flow generating module 115 and the document processing module 125. The flow managing module 120 stores a flow generated by the flow generating module 115 and performs an application of the flow (generation of a job) in accordance with an operation of the operator 197.

The document processing module 125 is connected to the flow managing module 120, the document storing module 130, and the job managing module 135. The document processing module 125 performs document processing in accordance with a flow defined in advance.

The document storing module 130 is connected to the document processing module 125. The document storing module 130 stores a document that is a processing target. For example, the document storing module 130 stores a document image read by a scanner.

The job managing module 135 is connected to the document processing module 125, an error determining module 145 of the error processing module 140, an error information storing module 150, an analysis module 155, and the operation-receiving and presenting module 160. The job managing module 135 manages job states and transitions in jobs (more specifically, a transition of execution from a process of which the execution has been completed to a next process among processes configuring a job). Then, in a case where a failure occurs in a job, the job managing module 135 applies a countermeasure designated by the operator 197 to the job.

In a case where a failure occurs, the job managing module 135 stores data in processing in the error information storing module 150 and restarts the job by using the data in processing in a case where the countermeasure is restarted.

The error processing module 140 includes an error determining module 145, an error information storing module 150, and an analysis module 155. The error processing module 140, in a case where a failure occurs in a job executed according to the flow, performs a process relating to the failure.

The error determining module 145 is connected to the error information storing module 150 and the job managing module 135 of the flow processing module 110. In a case where a countermeasure for a failure is received by the operation-receiving and presenting module 160, the error determining module 145 determines an error job having a similar error detail and lists the error job.

The error determining module 145 extracts another job in which a previous-stage process, which is a process before the failure in the flow, is similar from the error information storing module 150 storing plural jobs in which failures occur. Here, the "previous-stage process" represents a process performed before a process in which a failure occurs in a job executed according to the flow, among plural processes of the flow. Thus, the "previous-stage process" represents a process that has already been performed. Since there are cases where the success/failure of a process is due to a previous-stage process, the process of the previous stage is used for a determination of the similarity. In addition, as another job that is similar to the job, there may be a premise that the another job is a job in which a failure occurs in a process similar to the process in which the failure occurs.

Here, the "similarity" represents having common features as processes. It is apparent that the "having common features" includes the case of a exact match. For example, all the processes (from a first process within each job to a process immediately before a process in which a failure occurs) of the previous stages may match with each other, or a ratio (a total number of processes of the previous stage is set as a denominator, and the number of processes match with each other is set as a numerator) of match of processes of the previous stages may be more than or equal to or more than a predetermined threshold. In addition, as a process of previous stage, only a process immediately before a process in which a failure occurs may be used. Furthermore, the processes may be weighted. For example, it may be configured such that a process immediately before a process in which a failure occurs is highly weighted, and, as a process is located farther from the process in which the failure occurs (as a process is closer to the first process within the flow), the process may be weighted less.

In addition, the error determining module 145, in addition to the processes of a previous stage, may extract a job, in which one or a combination of a definition of the flow (for example, a content of a flow definition type field 420 of an error information table 400 to be described later), a place in which a failure occurs (more specifically, a process name and a line number within a program, for example, a content of a stack trace field 450 of the error information table 400 to be described later), a setting status of the process (for example, a content of a request parameter field 440 of the error information table 400 to be described later), a status of a parameter at the time of occurrence of a failure (for example, a content of an error-occurrence-time parameter field 445 of the error information table 400 to be described later), date and time at which a failure occurs (for example, a content of an error occurrence date and time field 415 of the error information table 400 to be described later), a flow generating person (for example, the flow generating person 192), and a person directing the execution of the job (for example, the operator 197, a content of a user ID field 430 of the error information table 400 to be described later) is similar. Here, similar date and time includes not only a case where a date and time difference between both processes is less than a predetermined threshold or equal to or less than a predetermined threshold but also a case where days in a week are the same, a case where both processes are in a predetermined period of a month (for example, the end of a month or the like), and the like.

Figure 4:
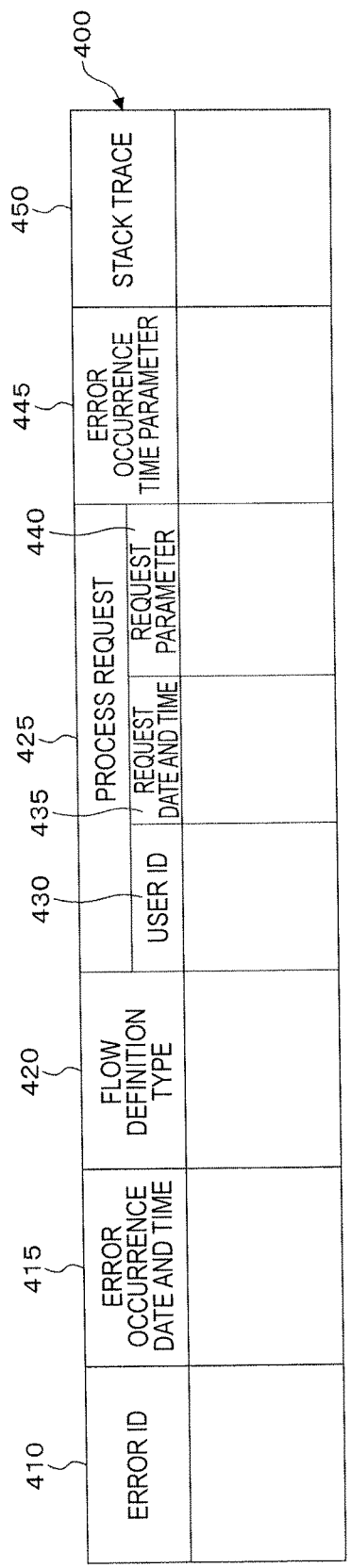
FIG. 4 is an explanatory diagram that illustrates an example of the data structure of an error information table.

The error information storing module 150 is connected to the error determining module 145 and the job managing module 135 of the flow processing module 110. The error information storing module 150 stores detailed data of a failure in association with an error job. For example, the error information storing module 150 stores the error information table 400. FIG. 4 is an explanatory diagram that illustrates an example of the data structure of the error information table 400. The error information table 400 includes: an error ID field 410; an error occurrence date and time field 415; a flow definition type field 420; a process request field 425; an error-occurrence-time parameter field 445; and a stack trace field 450. The process request field 425 includes: a user ID field 430; a request date and time field 435; and a request parameter field 440. The error ID field 410 stores information (error ID: Identification) used for uniquely identifying an error in this exemplary embodiment. The error occurrence date and time field 415 stores occurrence date and time (year, month, date, hour, minute, second, and less than a second, or a combination thereof) of the error. The flow definition type field 420 stores a type of flow definition according to a job in which the error occurs. The process request field 425 stores a process request. The user ID field 430 stores information (user ID) used for uniquely identifying a user (the operator 197) who has directed the execution of the job in this exemplary embodiment. The request date and time field 435 stores date and time at which an execution request of the job is performed. The request parameter field 440 stores a parameter requested for the execution of the job. As the parameter, for example, there are a processing priority, a recognition precision priority, and the like. The error-occurrence-time parameter field 445 stores a parameter at the time of occurrence of an error. As the parameter here, for example, there is a size of a frame used for character recognition or the like. In addition, whether a device reading an image is an office multifunctional device or a home scanner may be included as a parameter. The stack trace field 450 stores a stack trace at a time point when an error occurs. The stack trace is information used for playing back the execution process at the time of debugging a job (program) and is configured with a line number within a program at which an error occurs, a return address for returning to a source calling a function, a local variable, and the like.

The analysis module 155 is connected to the job managing module 135 of the flow processing module 110. The analysis module 155 performs an analysis based on operation histories and performs feedback to the flow generating person 192 based on a collected result.

The analysis module 155 presents a job in which a failure occurs, a countermeasure, and a countermeasure applied to a job by the operation-receiving and presenting module 160 to the flow generating person 192.

The operation-receiving and presenting module 160 is connected to the job managing module 135 of the flow processing module 110. The operation-receiving and presenting module 160 receives an operation performed by the operator 197 and presents an occurrence of a failure in the job, a similar error job, and the like. As such operations, for example, there are execution of a job, a countermeasure for a failure, and the like.

In a case where a failure occurs in a job performed according to the flow, the operation-receiving and presenting module 160 receives a countermeasure to be applied to the job.

Then, the operation-receiving and presenting module 160 presents a job extracted by the error determining module 145 and presents a direction indicating whether or not a countermeasure is applied to the job such that the direction can be received.

FIGS. 2A and 2B are explanatory diagrams that illustrate examples of the configuration of a system using this exemplary embodiment.

An image processing apparatus 200 illustrated in the example of FIG. 2A includes the information processing apparatus 100, and, for example, a copier, a facsimile, a scanner, a printer, or a multifunction device (an image processing apparatus having any two or more functions of a scanner, a printer, a copier, a facsimile, and the like) corresponds thereto. The information processing apparatus 100 is connected to the flow generating person terminal 190 and the operator terminal 195.

In the example illustrated in FIG. 2B, an information processing apparatus 100*b*, a flow generating person terminal 190*a*, a flow generating person terminal 190*b*, an operator terminal 195*a*, an operator terminal 195*b*, an operator terminal 195*c*, an image processing apparatus 200, an image processing apparatus 210*a*, and an image processing apparatus 210*b* are interconnected through a communication line 290. The communication line 290 may be a wireless channel, a wired line, or a combination thereof. For example, the communication line 290 may be the Internet as a communication infrastructure, an intranet, or the like. In addition, the function of the information processing apparatus 100*b* may be realized as a cloud service. The image processing apparatus 200 includes the information processing apparatus 100*a*. The image processing apparatus 210 executes a job by using the information processing apparatus 100*b* or the information processing apparatus 100*a* disposed inside the image processing apparatus 200.

Figure 3:
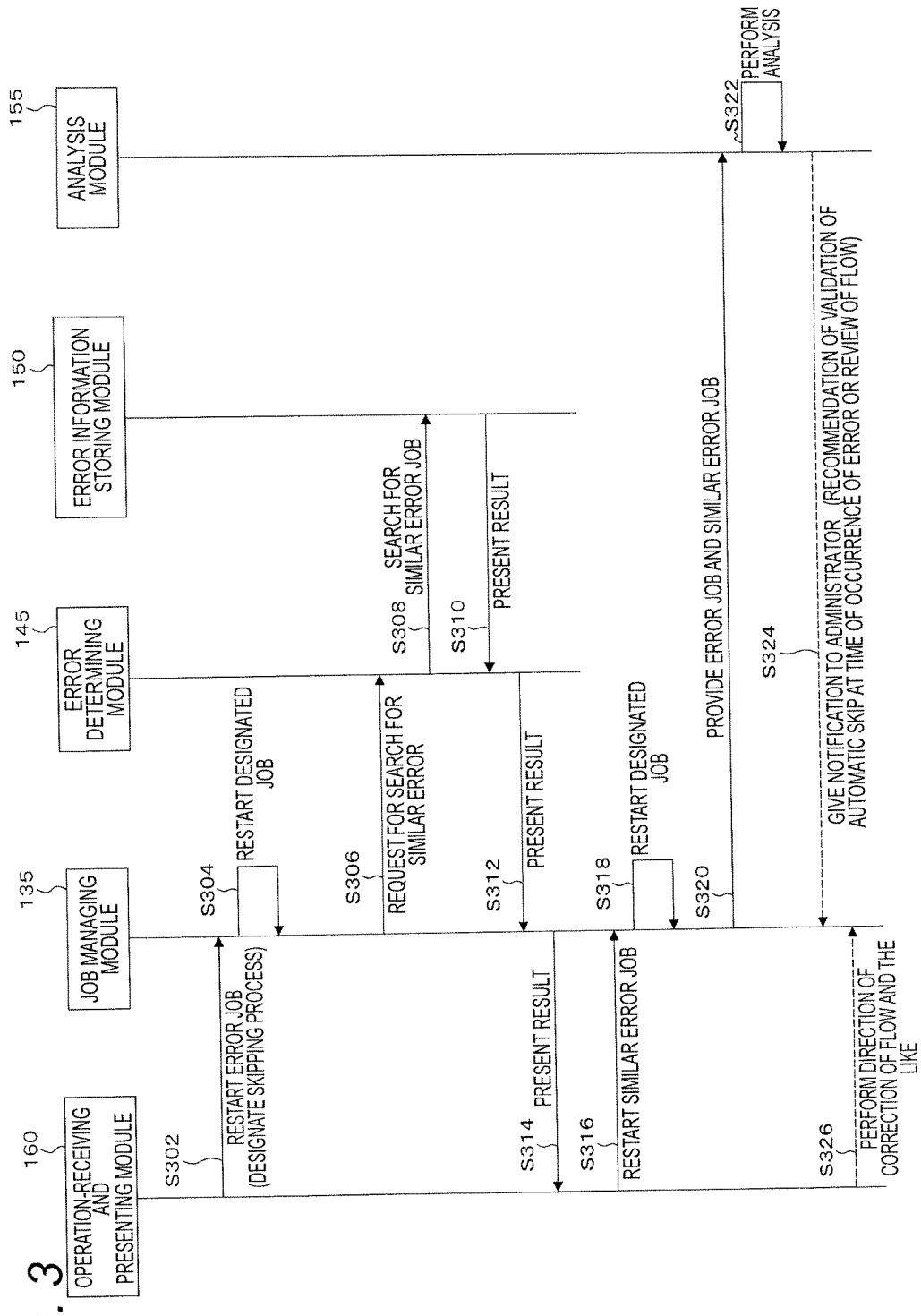
FIG. 3 is a flowchart that illustrates an example of the process according to this exemplary embodiment.

FIG. 3 is a flowchart that illustrates an example of the process according to this exemplary embodiment. The flowchart is an example of a process after an occurrence of an error job and illustrates an example of a process performed among the operation-receiving and presenting module 160, the job managing module 135, the error determining module 145, the error information storing module 150, and the analysis module 155.

In a case where an error occurs in the middle of a process within a job, the operator 197 is assumed to skip the process and perform an operation of continuing the job process.

In a case where "a job in which an error occurs" relating to the operator 197 who is an executer of the job in which the error occurs is already stored in the error information storing module 150, the following process is performed.

For example, the error determining module 145 of the information processing apparatus 100 transmits a mail having a content indicating an occurrence of an error or the like to the operator 197 (the operator terminal 195), and accordingly, the operator 197 knows that the error occurs in the job. In a case where plural errors occur, the operator 197 selects one from among the plural errors.

In Step S302, the operation-receiving and presenting module 160 directs the restart of the error job in accordance with a direction from the operator 197 (for example, designation of "skipping the process in which the error occurs" of the countermeasure (2)).

In Step S304, the job managing module 135 restarts the designated job.

In Step S306, the job managing module 135 requests the error determining module 145 to perform a search for a similar error.

In Step S308, the error determining module 145 searches the error information storing module 150 for the similar error job.

In Step S310, the error information storing module 150 returns a search result to the error determining module 145.

In Step S312, the error determining module 145 returns the search result to the job managing module 135.

In Step S314, the job managing module 135 presents the search result to the operation-receiving and presenting module 160.

In Step S316, the operation-receiving and presenting module 160 directs the restart of the similar error job in accordance with the direction from operator 197. The "restart" here is the same as the countermeasure ("skipping the process in which the error occurs" of the countermeasure (2)) in Step S302. In a case where there is a restart direction for plural similar error jobs from the operator 197, the plural similar error jobs are arranged together for the job managing module 135, and a restart process of the similar error jobs is performed.

In Step S318, the job managing module 135 restarts the designated job (similar error job).

In Step S320, the job managing module 135 provides information relating to the error job and the similar error job for the analysis module 155.

In Step S322, the analysis module 155 analyzes the error job and the similar error job. For example, as the analysis, there is generation of an error presentation list 830 illustrated in the example of FIG. 8 to be described later or the like. In addition, the analysis module 155 may analyze a feature amount by using an operation history of the countermeasure for the error job and change a determination parameter of the error determining module 145 such that jobs having a high degree of similarity of countermeasures are determined as jobs similar to each other. Furthermore, the analysis module 155 may present information relating to a process having a high error occurrence frequency to the flow generating person 192 or the operator 197.

In Step S324, the analysis module 155 gives a notification (a recommendation of validation of an automatic skip at the time of the occurrence of an error or a review of the flow) to the flow generating person 192.

In Step S326, the operation-receiving and presenting module 160, in order to relieve efforts for an operation, corrects a flow in which a countermeasure for an error job and the like are built in accordance with an operation of the flow generating person 192.

FIGS. 5A to 5D are explanatory diagrams that illustrate examples of a definition of a flow.

Figure 5A:
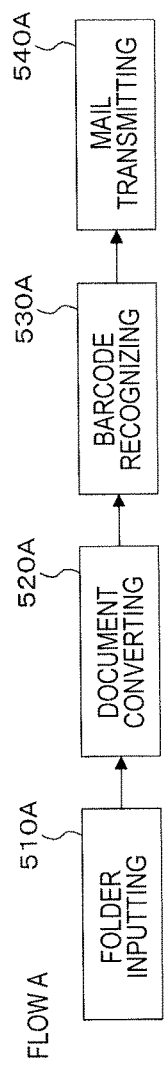
FIGS. 5A to 5D are explanatory diagrams that illustrate examples of a definition of a flow.

A flow A, as illustrated in the example of FIG. 5A, defines that the process of folder inputting 510A, document converting 520A, barcode recognizing 530A, and mail transmitting 540A is sequentially performed.

Figure 5B:
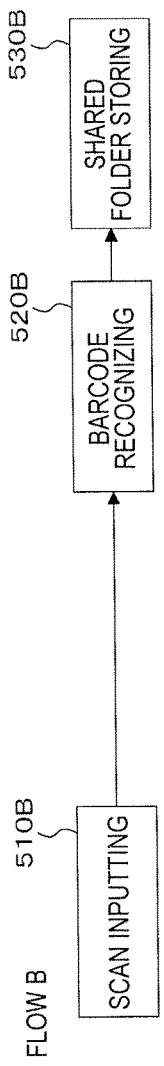

A flow B, as illustrated in the example of FIG. 5B, defines that the process of scan inputting 510B, barcode recognizing 520B, and shared folder storing 530B is sequentially performed.

Figure 5C:
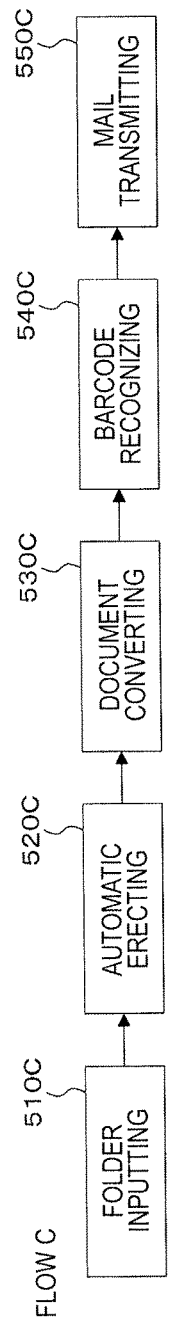

A flow C, as illustrated in the example of FIG. 5C, defines that the process of folder inputting 510C, automatic erecting 520C, document converting 530C, barcode recognizing 540C, and mail transmitting 550C is sequentially performed.

Figure 5D:
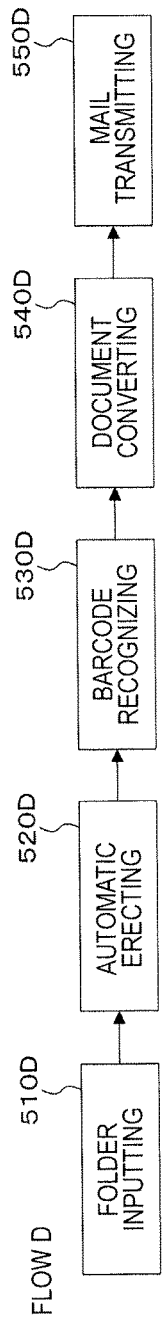

A flow D, as illustrated in the example of FIG. 5D, defines that the process of folder inputting 510D, automatic erecting 520D, barcode recognizing 530D, document converting 540D, and mail transmitting 550D is sequentially performed.

Figure 6:
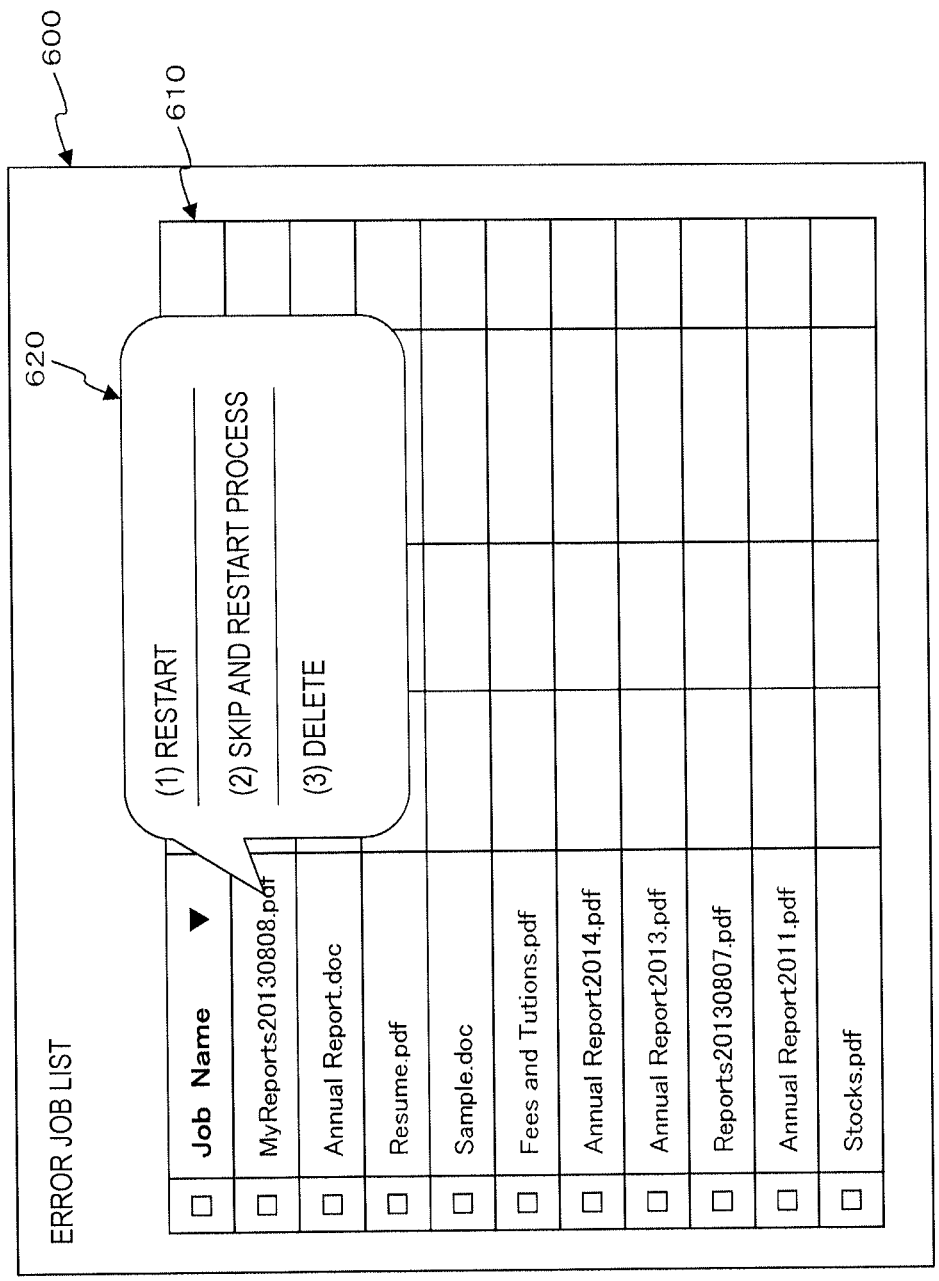
FIG. 6 is an explanatory diagram that illustrates an example of the presentation of an error operation list.

FIG. 6 is an explanatory diagram that illustrates an example of the presentation of an error operation list 620.

On an error job list screen 600, an error job list 610 is displayed. Then, in a case where one error job included inside the error job list 610 is selected, an error operation list 620 is displayed. Within the error operation list 620, countermeasures that can be selected for the error job are displayed. In the example illustrated in FIG. 6, (1) Restart (corresponding to the countermeasure (1) described above), (2) Skip Process and Restart (corresponding to the countermeasure (2) described above), and (3) Delete (corresponding to the countermeasure (3) described above) are displayed.

This selected error job is a job that is generated according to the flow A illustrated in the example of FIG. 5A. Then, an error occurs in the process of barcode recognizing (an instance of the barcode recognizing 530A). Also in a case where the barcode recognizing fails (fails in attribute assignment), the operator 197 determine that it is preferable to perform distribution (the attribute may be manually assigned later) and thus skips the process of the barcode recognizing and selects the restart (countermeasure (2)).

In addition, as described above for the error-occurrence-time parameter field 445 of the error information table 400 illustrated in the example of FIG. 4, in the process of reading an information image (for example, a barcode, a QR code (registered trademark), or the like), the type (more specifically, an office multifunction device or a home scanner) of the reading device may be set as a parameter for the similarity determination. The reason for this is that there are cases where the recognition of an image transmitted from a home scanner fails while an image transmitted from an office multifunction device is correctly recognized. In a case where an image transmitted from the home scanner is a target, changing to a recognition rate priority mode (the processing time is increased) may be presented as a countermeasure.

Figure 7:
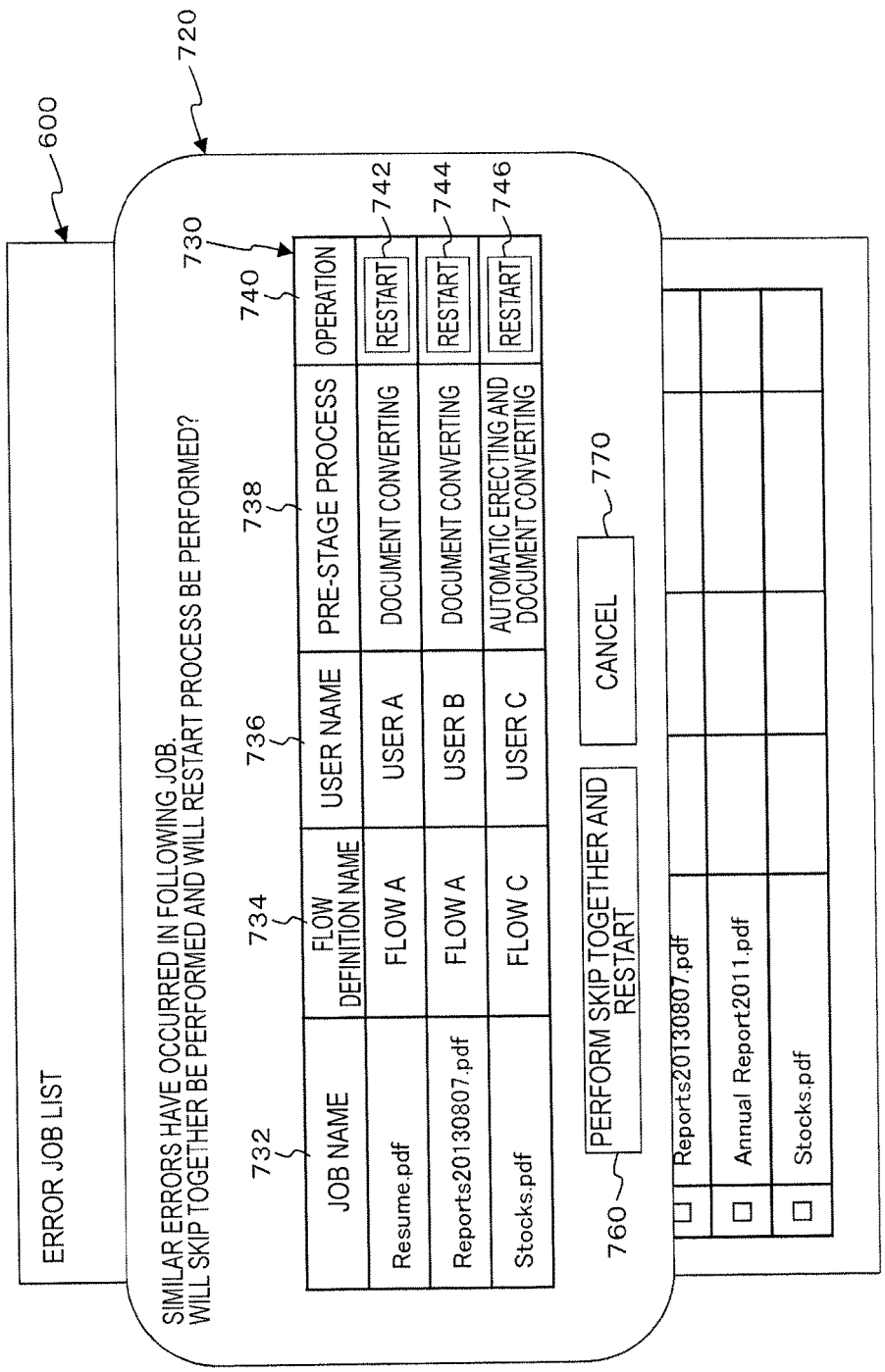
FIG. 7 is an explanatory diagram that illustrates an example of the presentation of a similar error job operation list.

FIG. 7 is an explanatory diagram that illustrates an example of the presentation of a similar error job operation list 720. In the example illustrated in FIG. 6, after the countermeasure (2) is selected, an example is illustrated in which error jobs similar to a target error job are presented. In the target error job (a job executed according to the flow A), an error occurs in the process of the barcode recognizing, and a process immediately before the process is document converting. The jobs (error jobs displayed within an error job display list 730) that are extracted as being similar are jobs, in which an error occurs in the process of the barcode recognizing, executed according to the flow A and are jobs, in which an error occurs in the process of the barcode recognizing, executed according to the flow C performing the process of the barcode recognizing after the process of the document converting.

In the similar error job operation list 720, for example, "Similar errors occur in the following jobs. Will the jobs be skipped together and will a restart process be performed?" is displayed. In addition, in the similar error job operation list 720, a previous-stage process of the error job for which the countermeasure is selected in the example of FIG. 6 may be presented. The operator 197 can check a previous-stage process of an error job similar to the target error job.

Then, in the similar error job operation list 720, the error job display list 730, a "skipping together and restart" button 760, and a cancel button 770 are displayed.

The error job display list 730 includes: a job name field 732, a flow definition name field 734; a user name field 736; a previous-stage process field 738; and an operation field 740. A job name is displayed in the job name field 732, a flow definition name is displayed in the flow definition name field 734, and a user name directing the execution of the job is displayed in the user name field 736. A previous-stage process of a process in which an error occurs in the error job is displayed in the previous-stage process field 738, and operation buttons 742, 744, and 746 are displayed in the operation field 740. These operation buttons represent countermeasures that are the same as the countermeasures selected in the example of FIG. 6.

The "skipping together and restart" button 760 is pressed in a case where the same countermeasure as the countermeasure selected in the example of FIG. 6 is applied to all the error jobs included within the error job display list 730.

The cancel button 770 is pressed in a case where the same countermeasure as the countermeasure selected in the example of FIG. 6 is not applied to the error jobs included within the error job display list 730.

In addition, similar error jobs may be presented only in a case where the countermeasure (2) is selected for the target error job.

Furthermore, a job, for which the operator is authorized, directed to be executed by another person is presented also as a similar job. For example, a user may be assumed to be authorized for an error job directed to be executed by another user belonging to the same group.

FIG. 8 is an explanatory diagram that illustrates an example of the presentation of an error job list 820. In the example, the analysis module 155 presents a result of the analysis to the flow generating person 192.

In the error job list 820, for example, "An error has occurred in the following flow, and the process is restarted. Please check the flow", "An error has occurred in the "barcode recognizing". Please check again the settings of "document converting"" are displayed.

In the error job list 820, the error presentation list 830 is displayed.

The error presentation list 830 includes: a flow definition name field 832; an execution number field 834; an error number field 836; a restart number field 838; an error occurrence place field 840; and an error-occurrence-time previous-stage process field 842. A flow definition name is displayed in the flow definition name field 832, the number of executions is displayed in the execution number field 834, and the number of errors is displayed in the error number field 836. In addition, the number of restarts is displayed in the restart number field 838, an error occurrence place is displayed in the error occurrence place field 840, and a previous-stage process at the time of occurrence of an error is displayed in the error-occurrence-time previous-stage process field 842.

In a case where a specific previous-process is assumed to be a cause by the analysis module 155, a presentation is performed for the flow generating person 192 based on the operation history.

An example of the hardware configuration of the information processing apparatus according to this exemplary embodiment will be described with reference to FIG. 9. The configuration illustrated in FIG. 9, for example, is configured with a personal computer (PC) or the like, and an example of the hardware configuration including a data reading unit 917 such as a scanner and a data output unit 918 such as a printer is illustrated.

A central processing unit (CPU) 901 is a control unit that performs a process according to a computer program describing an execution sequence of various modules described in the exemplary embodiment described above, in other words, modules such as the flow processing module 110, the flow generating module 115, the flow managing module 120, the document processing module 125, the job managing module 135, the error processing module 140, the error determining module 145, the analysis module 155, and the operation-receiving and presenting module 160.

A read only memory (ROM) 902 stores a program used by the CPU 901, operation parameters, and the like. A random access memory (RAM) 903 stores a program executed by the CPU 901, a parameter that is appropriately changed in the execution, and the like. These are interconnected using a host bus 904 configured with a CPU bus and the like.

The host bus 904 is connected to an external bus 906 such as a peripheral component interconnect/interface (PCI) bus through a bridge 905.

A keyboard 908 and a pointing device 909 such as a mouse are devices operated by the operator. A display 910 is a liquid crystal display device, a cathode ray tube (CRT), or the like and displays various kinds of information as texts or image information. In addition, a touch screen or the like having functions of both the pointing device 909 and the display 910 may be used.

A hard disk drive (HDD) 911 has a hard disk (may be a flash memory or the like) built therein, and programs executed by the CPU 901 and information are recorded or reproduced by driving the hard disk. The hard disk realizes the functions of the document storing module 130, the error information storing module 150, and the like. In addition, other various kinds of data, various computer programs, and the like are stored therein.

A drive 912 reads data or a program recorded on a removable recording medium 913 such as a magnetic disk, an optical disc, a magneto-optical disk, or a semiconductor memory that is loaded and supplies the data or the program to the RAM 903 connected through the interface 907, the external bus 906, the bridge 905, and the host bus 904. The removable recording medium 913 can be also used as a data recording area.

The connection port 914 is a port connecting an external connection device 915 and includes a connection unit such as a USB or IEEE1394. The connection port 914 is connected to the CPU 901 and the like through the interface 907, the external bus 906, the bridge 905, the host bus 904, and the like. A communication unit 916 is connected to the communication line and performs a process of a data communication with the outside. The data reading unit 917, for example, is a scanner and performs a document reading process. The data output unit 918, for example, is a printer and performs a process of outputting document data.

The hardware configuration of the information processing apparatus illustrated in FIG. 9 represents one configuration example. Thus, this exemplary embodiment is not limited to the configuration illustrated in FIG. 9 but may have a configuration in which the modules described in this exemplary embodiment can be executed. For example, some modules may be configured using dedicated hardware (for example, an application specific integrated circuit (ASIC) or the like), and some modules may be disposed inside an external system and have a form of being connected through a communication line. Furthermore, plural systems illustrated in FIG. 9 may be interconnected through a communication line and be configured to operate in cooperation with each other. Particularly, other than the personal computer, the modules may be built in a mobile information communication apparatus (including a mobile phone, a smartphone, a mobile device, a wearable computer, and the like), an information appliance, a robot, a copier, a facsimile, a scanner, a printer, a multifunction device, or the like.

In addition, the described program may be provided with being stored on a recording medium, or the program may be provided by a communicating unit. In such a case, for example, the program described above may be perceived as an invention of a "computer-readable recording medium on which a program is recorded".

Here, the "computer-readable recording medium on which a program is recorded" represents a recording medium on which a program, which is used for program installation, execution, program distribution, and the like, that can be read by a computer is recorded.

Examples of the recording medium include "a DVD-R, a DVD-RW, a DVD-RAM, or the like" that is a digital versatile disc (DVD) and is a standard formulated by a DVD forum, "a DVD+R, a DVD-RW, or the like" that is a standard formulated as a DVD+RW, a read only memory (CD-ROM), a CD recordable (CD-R), a CD-rewritable (CD-RW), or the like that is a compact disc (CD), a Blu-ray (registered trademark) disc, a magneto-optical disk (MO), a flexible disk (FD), a magnetic tape, a hard disk, a read only memory (ROM), an electrically-erasable and rewritable read only memory (EEPROM (registered trademark)), a flash memory, a random access memory (RAM), a secure digital (SD) memory card, and the like.

The whole or a part of the program described above may be recorded on the recording medium and be stored or distributed. In addition, the program may be transmitted through communication, for example, by using a wired network or a wireless communication network used for a local area network (LAN), a metropolitan area network (MAN), a wide area network (WAN), the Internet, an intranet, an extranet, or the like or a transmission medium of a combination thereof or may be carried with being loaded in a carrier wave.

In addition, the program described above may be a part or the whole of another program or may be recorded on a recording medium together with a separate program. Furthermore, the program may be recorded on plural recording media in a divisional manner. In addition, the program may be recorded in any form such as a compressed form or an encrypted form that can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
  a processor configured to:
    in response to an interruption of a job due to a failure occurring in the job, which is executed at an image processing apparatus according to a flow that defines a series of processes for a document image, receive a countermeasure applied to the job, the countermeasure being one of (i) re-execution of the job, (ii) skipping of a process in which the failure occurs and restarting of the job from a middle of the job, and (iii) deleting the job;
    extract, from a memory storing plural jobs interrupted due to failures, another job in which a previous-stage process, which is a process that is performed before a process in which the failure occurs in the flow, is similar to that of the job executed at the image processing apparatus; and
    present the extracted job such that a direction indicating whether or not the countermeasure is to be applied to the extracted job can be received.

2. The information processing apparatus according to claim 1,
  wherein the processor, in addition to the previous-stage process, is further configured to extract a job in which one or a combination of (i) a definition of the flow, (ii) a place at which the failure occurs, (iii) a set status of a process, (iv) a status of a parameter at the time of occurrence of the failure, (v) failure occurrence date and time, (vi) a generating person of the flow, and (vii) a person directing execution of the job or a combination thereof is similar to that of the job executed at the image processing apparatus.

3. The information processing apparatus according to claim 1, wherein the processor is further configured to present the job in which the failure occurs and the countermeasure to a generating person of the flow.

4. The information processing apparatus according to claim 1, wherein the processor is further configured to store data in processing in response to the failure occurring and restart a job by using the data in processing when the countermeasure is performed.

5. A non-transitory computer readable medium storing a program causing a processor of a computer to execute a process for information processing, the process comprising:
  in response to an interruption of a job due to a failure occurring in the job, which is executed at an image processing apparatus according to a flow that defines a series of processes for a document image, receiving a countermeasure applied to the job, the countermeasure being one of (i) re-execution of the job, (ii) skipping of a process in which the failure occurs and restarting of the job from a middle of the job, and (iii) deleting the job;
  extracting, from a memory storing plural jobs interrupted due to failures, another job in which a previous-stage process, which is a process that is performed before a process in which the failure occurs in the flow, is similar to that of the job executed at the image processing apparatus; and
  presenting the extracted job such that a direction indicating whether or not the countermeasure is to be applied to the extracted job can be received.

6. An information processing method executed by a processor, the method comprising:
  in response to an interruption of a job due to a failure occurring in the job, which is executed at an image processing apparatus according to a flow that defines a series of processes for a document image, receiving a countermeasure applied to the job, the countermeasure being one of (i) re-execution of the job, (ii) skipping of a process in which the failure occurs and restarting of the job from a middle of the job, and (iii) deleting the job;
  extracting, from a memory storing plural jobs interrupted due to failures, another job in which a previous-stage process, which is a process that is performed before a process in which the failure occurs in the flow, is similar to that of the job executed at the image processing apparatus; and
  presenting the extracted job such that a direction indicating whether or not the countermeasure is to be applied to the extracted job can be received.

* * * * *